United States Patent [19]

Ward

[11] 4,170,801
[45] Oct. 16, 1979

[54] FISHING ROD AND REEL BOX

[75] Inventor: Milton K. Ward, Monticello, Ark.

[73] Assignee: DuraCraft Boats, Inc., Monticello, Ark.

[21] Appl. No.: 854,195

[22] Filed: Nov. 23, 1977

[51] Int. Cl.² .............................................. B63B 17/00
[52] U.S. Cl. ............................................. 9/1.1; 43/26;
  206/315 R; 211/60 R; 224/922
[58] Field of Search .................... 206/315 R, 317, 372,
  206/373; 224/29 R, 42.45 R, 42.46 R, 42.43, 32
  A, 42.1 C, 42.1 G, 42.1 F; 43/26; 211/60 R, 64;
  9/1.1, 1.7

[56] References Cited

U.S. PATENT DOCUMENTS

| 2,771,305 | 11/1956 | Buegeleisen | 224/32 A X |
| 3,181,753 | 5/1965 | Fitch | 224/29 R |
| 3,201,017 | 8/1965 | Morrissey | 206/315 X |
| 3,291,427 | 12/1966 | Hutchings | 211/60 R X |
| 3,399,009 | 8/1968 | Slade | 206/315 X |

Primary Examiner—Trygve M. Blix
Assistant Examiner—Sherman D. Basinger
Attorney, Agent, or Firm—Clarence A. O'Brien; Harvey B. Jacobson

[57] ABSTRACT

An elongated fishing rod box is provided including first and second elongated housing sections opening toward each other and including a first pair of corresponding longitudinal side walls pivotally secured together for relative swinging between open and closed positions about an axis paralleling the side walls. Clamp structures are supported within one of the sections at points spaced longitudinally therealong for supporting assembled rod and reel assemblies within the box, and a first of the sections includes a longitudinal wall thereof remote from the other section having anchor structure shiftably supported therefrom at points spaced therealong and provided with manually operable first portions thereof within the first section and second portions thereof disposed outwardly of the longitudinal wall of the first section for releasable support from anchor members supported from suitable support surface portions. The housing sections include a second pair of corresponding longitudinal side walls remote from the first pair of corresponding side walls of the housing sections including coacting latch structures for releasably securing the housing sections in closed positions and the latch structures may be releasably locked in the latched positions thereof.

2 Claims, 9 Drawing Figures

FISHING ROD AND REEL BOX

BACKGROUND OF THE INVENTION

Many fishermen travel great distances to fish and transport a plurality of fishing rods with them when they go on a fishing trip. As a result, the fishermen is confronted with the problem of transporting several fishing rods over long distances (perhaps in several different vehicles) in a manner protecting his rods and reels against damage and also supporting them in a manner such that they may be conveniently carried without the various rods and lines supported therefrom becoming entangled.

Although various forms of cases have been heretofore provided in which one or more fishing rods may be housed, most of these cases do not provide structure whereby a plurality of fishing rod and reel assemblies may be stationarily supported relative to each other in a manner preventing entanglement of the rods and fishing lines supported therefrom. In addition, many previously known forms of fishing rod cases are constructed in a manner to receive fishing rods therein only in disassembled condition. It is further noted that many forms of fishing rod cases are not constructed in a manner enabling a plurality of fishing rod and reel assemblies to be supported therein with the respective fishing lines thereof ready for instant use. Accordingly, a need exists for a fishing rod box or case in which a plurality of fully assembled fishing rod and reel assemblies may be supported in stationary spaced relation relative to each other and with the rod and reel assemblies protected against damage from the exterior of the case and also ready for instant use. In addition, a need exists for a fishing rod box or case constructed in a manner whereby it may be transported in various types of vehicles (including aircraft baggage compartments) with ease.

Various forms of cases including some of the general structural and operational features of the instant invention are disclosed in U.S. Pat. Nos. 442,269, 1,714,263, 2,650,449, 3,376,614, 3,399,099, 3,406,930, 3,410,018, 3,662,933 and 3,802,113.

BRIEF DESCRIPTION OF THE INVENTION

The fishing rod box of the instant invention includes first and second elongated housing sections opening toward each other and constructed of high impact plastic. The housing sections include a first pair of corresponding longitudinal side walls pivotally secured together for relative swinging of the housing sections about an axis paralleling the side walls between open and closed positions of the housing sections. Clamp structures are supported within one of the housing sections at points spaced longitudinally therealong for supporting fully assembled rod and reel assemblies within the box. A first of the sections includes a longitudinal wall thereof remote from the other section having anchor structure shiftably supported therefrom at points spaced longitudinally therealong and provided with manually operable first portions thereof within the first housing section and second portions thereof disposed outwardly of the first section for releasable support from anchor members supported from a suitable support surface. The clamp structures for supporting fully assembled fishing rod and reel assemblies within the fishing rod box are constructed in a manner whereby a fully assembled fishing rod and reel assembly may be readily removed from the box and substantially immediately placed in use.

The box is constructed of a high impact plastic whereby the rod and reel assemblies disposed therein will be protected from damage and the box may be readily carried in various of transport vehicles. Further, the box may be readily removably supported from the inner side of the side wall of a fishing boat and a fisherman within the boat may quickly change rod and reel assemblies.

The main object of this invention is to provide a fishing box which will enable a fisherman to protectively house a plurality of fully assembled fishing rod and reel assemblies within a single unit for ease in transport from one location to another.

Another object of this invention is to provide a fishing rod box constructed in a manner enabling it to be readily carried in the luggage compartments of various commercial transportation vehicles.

Still another object of this invention is to provide a fishing rod box in accordance with the preceding objects and including structure whereby the fishing rod box may be readily removably supported from various support surfaces through the utilization of anchor structure operable from within the box.

Another important object of this invention is to provide a fishing rod box including latch structure which may be releasably locked in the latched position.

A final object of this invention to be specifically enumerated herein is to provide a fishing rod box in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operatiion as more fully hereinafter described and claimed, reference being had to the accompanying drawings forming a part hereof, wherein like numerals refer to like parts throughout.

DETAILED DESCRIPTION OF THE INVENTION

Figure 1:
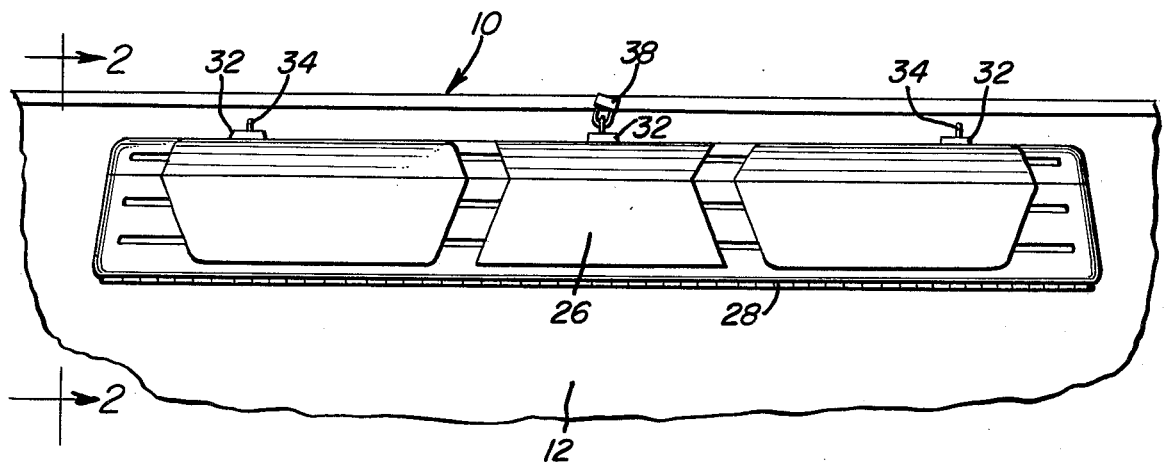
FIG. 1 is a fragmentary elevational view of the inner side of a side wall of a boat and with the fishing rod box of the instant invention mounted on the side wall of the boat.

Referring now more specifically to the drawings, the numeral 10 generally designates a fishing boat including an inner side wall portion 12. The inner side wall portion 12 has a pair of spaced apart mount surfaces with longitudinally spaced upstanding channel members 14 secured thereto by means of rivets 16 or other suitable fasteners. The channel members 14 include bight portions 18 remote from the inner side wall 12 and each of the bight portions 18 has a plurality of stationary anchor structures 20 of conventional design supported therefrom. The anchor structures 20 are enclosed within the channel members 14 inwardly of the bight portions 18 thereof.

The fishing rod box of the instant invention is referred to in general by the reference numeral 22 and includes first and second elongated housing sections 24 and 26. The section 24 may be considered the base section and the section 26 may be considered the top section. A longitudinally extending hinge assembly 28 hingedly supports the top section 26 from the base section 24 for swinging of the top section 26 between the closed and open positions thereof illustrated in solid and phantom lines, respectively, in FIG. 2. In addition, the sections 24 and 26 include longitudinally spaced pairs of coacting latch structures 30 and 32 for releasably latching the top section 26 in the closed position thereof and each of the latch structures 32 includes an apertured portion 34 through which the hasp 36 of a padlock 38 may be passed in order to secure the corresponding latch structure 32 in the closed position.

The bottom and top sections 24 and 26 include longitudinal ribs 40 and 42 for stiffening purposes and the bottom wall 46 of the base section 24 includes a pair of longitudinally spaced transverse mounting bars 48 secured to the inner surface thereof and each mounting bar 48 includes three longitudinally spaced clamped assemblies 50 which may be utilized to releasably clampingly support a plurality of fully assembled fishing rod and reel assemblies 52 within the base section 24. Also, the bottom wall 46 has two longitudinally spaced pairs of transversely spaced grommets 54 secured through openings 56 formed through the bottom wall 46 and apertures 55 formed in backing strips 57 secured to and overlying the outer surface of the wall 46 and the grommets 54 are secured through the bottom wall 46 by means of retaining washers 58. The grommets rotatably receive anchor structures referred to in general by the reference numeral 60 therethrough and one set of corresponding ends of the anchor structures 60 are disposed within the base section 24 and are provided with thumb engageable heads 62 while the other end of the anchor structures 60 include contoured heads 64 disposed exteriorly of the bottom wall 46, projectible through apertures 66 provided in the bight portions 18 and releasably engageable with the corresponding anchor structures 20 mounted within the channel members 14 in registry with the apertures 66.

The anchor structures 20 are secured within the channel members 14 by means of suitable fasteners (not shown) secured through apertures 68 formed in the bight portions 18 and apertures 70 formed through the anchor structures 20. The heads 64 are projectible through the apertures 66 and releasably engageable within and behind the contoured central portions 74 of the anchor structures 20, the anchor structures 20 and 16 being of conventional design.

Figure 2:
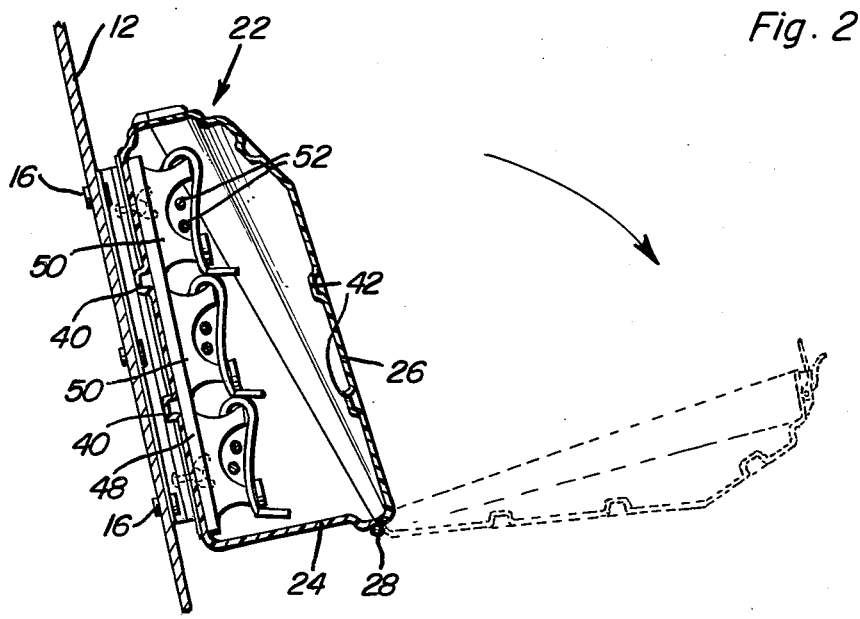
FIG. 2 is an enlarged fragmentary vertical sectional view taken substantially upon the plane indicated by the section line 2—2 of FIG. 1 and with an open position of the top of the box illustrated in phantom lines.
Figure 5:
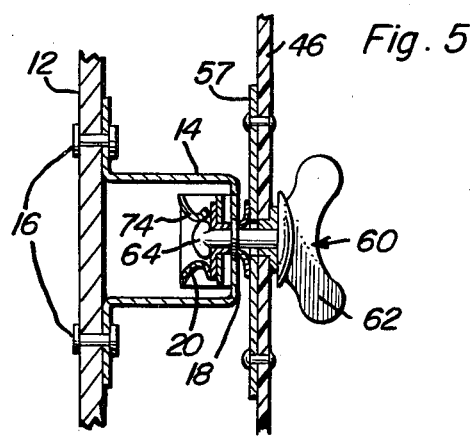
FIG. 5 is an enlarged fragmentary horizontal sectional view illustrating the manner in which the anchor structure is operative to releasably support the fishing rod box from channel members supported from the inner side walls of the boat.
Figure 6:
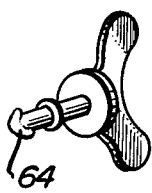
FIG. 6 is a perspective view of the shiftable portion of the box supporting anchor structure.
Figure 7:
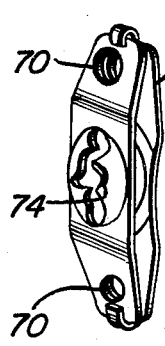
FIG. 7 is a perspective view of the stationary boat mounted anchor structure with which the shiftable box mounting anchor structure is operatively engageable to support the box from the channel member illustrated in FIG. 5.
Figure 3:
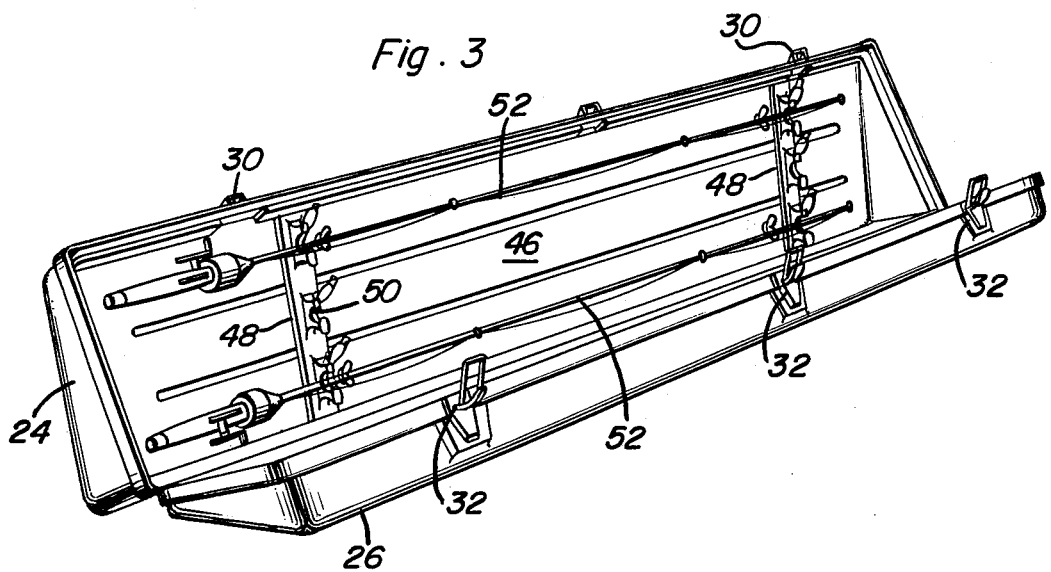
FIG. 3 is a perspective view of the fishing rod box in an open position.
Figure 4:
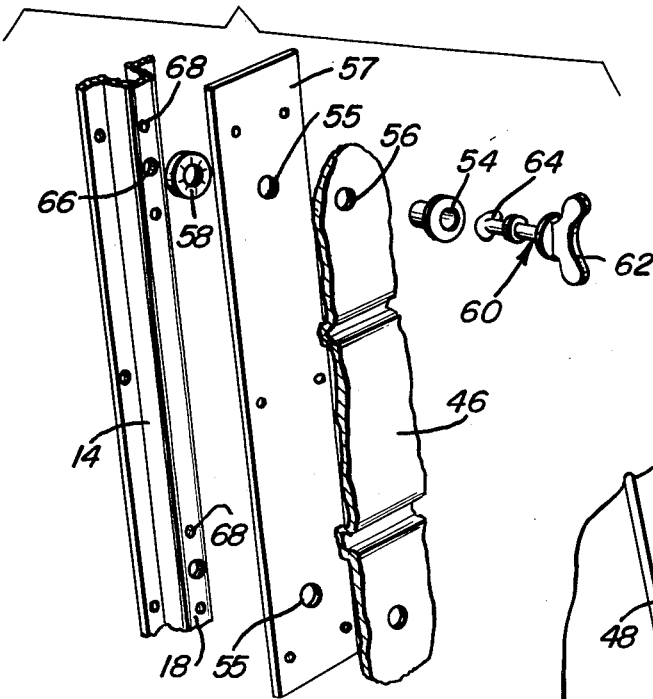
FIG. 4 is an exploded fragmentary perspective view illustrating the manner in which the anchor structure carried by the fishing rod box may be utilized in conjunction with bolt mounted anchor structure to releasably support the fishing rod box from the inner side of the boat side wall.
Figure 8:
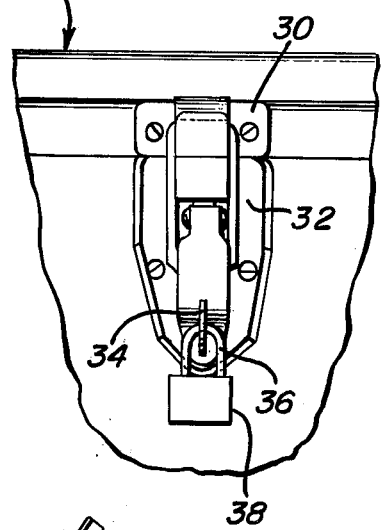
FIG. 8 is an enlarged fragmentary elevational view of the top of the fishing rod box illustrating the manner in which at least one of the latches thereof may be locked in the locked position.
Figure 9:
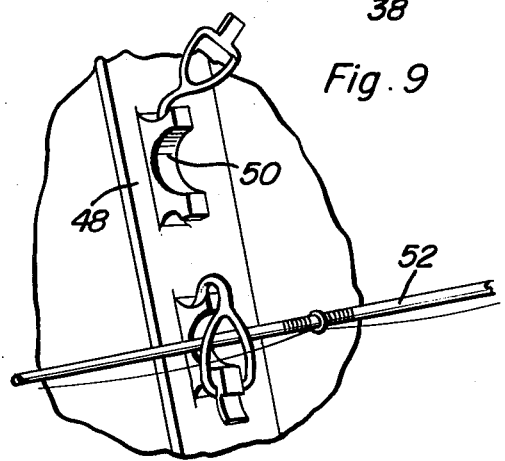
FIG. 9 is a fragmentary perspective view of the interior of a fishing rod box illustrating the manner in which one of the housing sections thereof is equipped with clamp structure for clampingly supporting a plurality of fully assembled rod and reel assemblies within the box.

In operation, channel members such as the channel members 14 may be secured to the inner side of the inner side wall 12 of the boat 10 in the manner illustrated and the fishing rod box 22 may be mounted on the channel members 14 in a manner which is believed to be obvious from FIGS. 2 and 5 of the drawings, the head portions 62 of the anchor structures 60 disposed within the base section 24 being readily engageable so as to release the anchor structures 60 from the anchor structures 20 when it is desired to remove the box 22 from the boat 10. The fishing rod box 22 may have as many as six fully assembled fishing rod and reel assemblies mounted therein against damage during transport and the box 22 may be readily carried within a motor vehicle or within the luggage compartment of a bus, train, or aircraft with assurance that the rod and reel assemblies within the box 22 will be protected against damage. In addition, structure equivalent to the channel members 14 may be mounted within a camper cap on the back of a pickup truck for support of the box 22 within the camper cap and structure similar to the channel members 14 may also be mounted within a closet, or the like, in a fisherman's home in order that the box 22 may be supported in elevated position within the closet.

The box 22 may be readily transported over long distances with assurance that the fishing rod and reel assembles 52 therein will be protected against damage. Further, the box 22 may be mounted within the boat 10 in the manner illustrated in FIG. 2 of the drawings and the top section 26 of the box 22 may be quickly opened in order that a fisherman may change, quickly, from one fishing rod and reel assembly to another, the change requiring only a fraction of a minute. Further, the rod and reel assemblies 52 within the box 22 may be ready for instant use, inasmuch as a selected lure may already be attached to the fishing line.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. An elongated fishing rod and reel container and carrying case for removable mounting within a vehicle such as a boat defining horizontally spaced apart mounting surfaces, said case including first and second elongated housing sections opening toward each other and including a first pair of corresponding longitudinal side walls pivotally secured together for relative swinging between open and closed positions about an axis paralleling said side walls, clamp structures supported within one of said sections at points spaced longitudinally therealong for supporting assembled rod and reel assemblies within said case, a first of said sections including a longitudinal wall thereof remote from the other section having longitudinally spaced pairs of laterally spaced apart anchor means shiftably supported therefrom and provided with a manually operable first portion thereof within said first section and the second portions thereof disposed outwardly of said longitudinal wall of said first section, a pair of channel members including bight portions and for support from said mounting surfaces in relatively parallel relation and with said channel members opening toward said mounting surfaces, a pair of anchor members supported from each bight portion at points spaced therealong, said longitudinal wall of said first section including a plurality of transversely spaced longitudinal ribs, a pair of flat reinforcing bars overlying the outer surface of said one longitudinal wall of said first section at points spaced longitudinally therealong and with said bars extending transversely of said longitudinal wall of said first section and secured thereto, the opposite end portions of each of said reinforcing bars including first bores formed therethrough, the portions of said longitudinal wall of said first section aligned with said first bores having second bores formed therethrough, two pairs of grommets, each pair of grommets being secured through a corresponding pair of registered first and second bores, said anchor means including a shank portion rotatably received through each pair of registered first and second bores, said first portions of said anchor means being carried by the end portions of said shank portions projecting into said first case section and said second portions of said anchor means being carried by the opposite end portions of said shank portions projecting outwardly from the outer surface of said one longitudinal wall of said first section, each of said channel members having a pair of longitudinally spaced bores formed in its bight portion and said pair of anchor members supported therewithin in registry with said bight portion bores, said second portions of said anchor means projecting through said bight portion bores and being releasably engaged with said anchor members for removable support of said case from said channel members.

2. The combination of claim 2 wherein said sections include a second pair of corresponding longitudinal side walls remote from said first pair of walls and equipped with coacting releasable latch means for retaining said case in a closed position, said coacting latch means including means adapting said latch means to be locked in the latched positions thereof.

* * * * *